United States Patent [19]
Van Der Wal et al.

[11] Patent Number: 6,044,002
[45] Date of Patent: Mar. 28, 2000

[54] FLYBACK CONVERTER WITH LIMITED OUTPUT POWER

[75] Inventors: Roelf Van Der Wal; Wilhelmus G.M. Ettes, both of Drachten, Netherlands

[73] Assignee: U.S. Philips Corporation, New York, N.Y.

[21] Appl. No.: 09/236,310

[22] Filed: Jan. 22, 1999

[30] Foreign Application Priority Data

Jan. 30, 1998 [EP] European Pat. Off. .............. 98200275

[51] Int. Cl.$^7$ ................................................. H02M 3/335
[52] U.S. Cl. ............................................... 363/97; 363/21
[58] Field of Search ................... 363/20, 21, 97, 363/98, 131, 132, 56, 95

[56] References Cited

U.S. PATENT DOCUMENTS

| | | | |
|---|---|---|---|
| 4,887,199 | 12/1989 | Whittle | 363/49 |
| 5,117,157 | 5/1992 | Vos | 315/173 |
| 5,122,945 | 6/1992 | Marawi | 363/21 |
| 5,694,025 | 12/1997 | Oglesbee et al. | 320/137 |
| 5,734,563 | 3/1998 | Shinada | 363/21 |
| 5,831,837 | 11/1998 | Coyne et al. | 363/21 |

OTHER PUBLICATIONS

"TOP210" Power Integrations, Inc., pp. 2–32 through 2–45, Jul. 1996.

*Primary Examiner*—Adolf Deneke Berhane
*Attorney, Agent, or Firm*—Ernestine C. Bartlett; Bernard Franzblau

[57] ABSTRACT

A flyback converter based on a switcher IC with Pulse Width Modulation control of the switching transistor. The pulse width is controlled by changing the input current at the control input. Under normal operating conditions the voltage at the control input is maintained at a fixed level, which voltage also serves as a supply voltage for the control unit. A charge pump provides extra charge for the smoothing capacitor at the control input when the load would cause the voltage across the smoothing capacitor to collapse below the fixed level, thereby preventing the control unit from entering the auto-restart mode of the switcher IC. In this way the flyback converter can be used as a constant power source for charging rechargeable batteries with a working voltage lower than the nominal operating output voltage of the converter.

4 Claims, 3 Drawing Sheets

FLYBACK CONVERTER WITH LIMITED OUTPUT POWER

BACKGROUND OF THE INVENTION

This invention relates to a switched-mode power supply, comprising:

a transformer having a primary winding and at least an auxiliary winding;

a controllable switch connected in series with the primary winding so as to receive an input voltage;

a control circuit having an output coupled to a control input of the controllable switch to supply control signals to the controllable switch for turning on and turning off the controllable switch, and having a control input for receiving a control voltage for powering the control circuit and for controlling the timing of the turn-on and turn-off of the controllable switch; and a rectifier and a smoothing capacitor connected in series to the auxiliary winding to generate the control voltage.

Such a switched-mode power supply is known from the specifications of a switcher IC type TOP210 published July 1996 and which is commercially available from Power Integrations, Inc. In said switcher IC the controllable switch is a MOSFET switching transistor. The control circuit inter alia includes a pulse width controller for varying the ratio between the off period and the on period of the switching transistor. The duty cycle of the pulse width is determined by the amount of current which flows into the control input. The voltage on the control input is maintained constant by special means in the control circuit. This constant voltage also serves as the supply voltage for the control circuit. Since the smoothing capacitor is connected to the control input, the voltage on the smoothing capacitor in normal operation is equal to the constant voltage. As a result of this, there is a fixed relationship between the amplitude of the alternating voltage across the auxiliary winding and the constant voltage. The transformer in the known switched-mode power supply further has a secondary winding which is connected via a rectifier to a load to be powered. The turns ratio between the auxiliary winding and the secondary winding defines the amplitude of the alternating voltage across the secondary winding and, consequently, that of the rectified voltage across the load. In this way there is a fixed relationship between the direct voltage across the load to be powered and the constant voltage on the control input of the control circuit of the switcher IC. This known switched-mode power supply is very suitable for powering a load with a fixed voltage. The peak current through the switching transistor is limited by comparing the voltage drop across the switching transistor with a reference voltage and by forcing the switching transistor out of conduction as soon as the voltage drop exceeds the reference voltage. This peak current limitation protects the switching transistor against overloading and limits the power supplied by the power supply. However, if the load to be powered becomes so large as a result of, for example a short-circuit or if the load to be powered is a rechargeable battery which is still in a substantially exhausted condition, the a.c. component across the secondary winding decreases and, as a result of this, the a.c. component across the auxiliary winding also decreases. The rectified voltage across the smoothing capacitor, which also forms the supply voltage for the control circuit, then drops below a critical limit. Below this limit the control circuit is set to the so-called auto-restart mode, in which the control circuit attempts to build up enough voltage, with a duty cycle of 5 percent, across the load to be powered and, consequently, also across the smoothing capacitor to eventually allow a return to normal operation. Under these conditions the known power supply circuit does supply some power to the load to be powered but this is usually much lower than the desired power. If the load to be powered is a substantially exhausted rechargeable battery it will take a long time before the battery voltage, if in fact it does become high enough when the battery is full, has increased sufficiently to restore the known power supply circuit to normal operation and to subsequently charge the battery to a fully charged condition at a satisfactory rate.

SUMMARY OF THE INVENTION

It is an object of the invention to provide a solution to the problem described hereinbefore. To this end the switched-mode power supply of the type defined in the opening paragraph is characterized in that the switched-mode power supply further comprises:

a charge pump coupled to the auxiliary winding to convert an alternating voltage across the auxiliary winding into a direct voltage across the smoothing capacitor.

As soon as the alternating voltage across the auxiliary winding falls below an amplitude for which the rectified voltage across the smoothing capacitor decreases below the constant voltage, which would cause the control circuit to switch to the auto-restart mode, the charge pump provides extra charge for the smoothing capacitor, as a result of which the voltage across the smoothing capacitor can be maintained at the constant voltage for a longer time and the control circuit does not yet change over to the auto-restart mode. As long as the amplitude of the alternating voltage across the auxiliary winding is still sufficiently large the switched-mode power supply in accordance with the invention behaves as a source of constant power when the voltage across the load to be powered decreases below the nominal value. As a matter fact, the control circuit remains operative and in each switching cycle of the switching transistor a power proportional to the switching frequency and the square of the peak current through the primary winding builds up in the primary winding. Since both the switching frequency and the peak current are constant a constant average power is supplied to the load to be powered. The load to be powered can be a rechargeable battery of for example 2.5 V only, while the nominal supply voltage is for example 12 V. Thus, the power supply circuit in accordance with the invention is both suitable for powering loads with 12 V, or any other nominal voltage, and for rapidly charging batteries with a voltage much smaller than the nominal voltage. As a result of this, the power supply circuit is suitable for general use in all kinds of apparatuses with rechargeable batteries, such as shavers, electric toothbrushes, vacuum cleaners, telephone sets, audio equipment, video equipment, computer equipment and the like because the batteries of these apparatuses will be charged with a constant power while in the case of a real short-circuit the existing safety feature, i.e. the auto-restart mode, is maintained.

The charge pump preferably comprises a further capacitor and a first diode, connected in series across the auxiliary winding, and a second diode, connected between the smoothing capacitor and a node between the further capacitor and the first diode. Thus, the desired result is obtained with a minimal number of parts. By using a zener diode for the first diode it is achieved that the charge pump is not operative in normal operation. The zener diode limits the alternating voltage on the node between the further capacitor and the first diode and prevents the second diode from being turned on when the constant voltage which is characteristic of normal operation of the control circuit appears across the smoothing capacitor.

BRIEF DESCRIPTION OF THE DRAWINGS

These and other aspects of the invention will be described and elucidated with reference to the accompanying drawings, in which.

In these Figures parts having a like function or purpose bear the same reference symbols.

DESCRIPTION OF THE PREFERRED EMBODIMENTS

Figure 1:
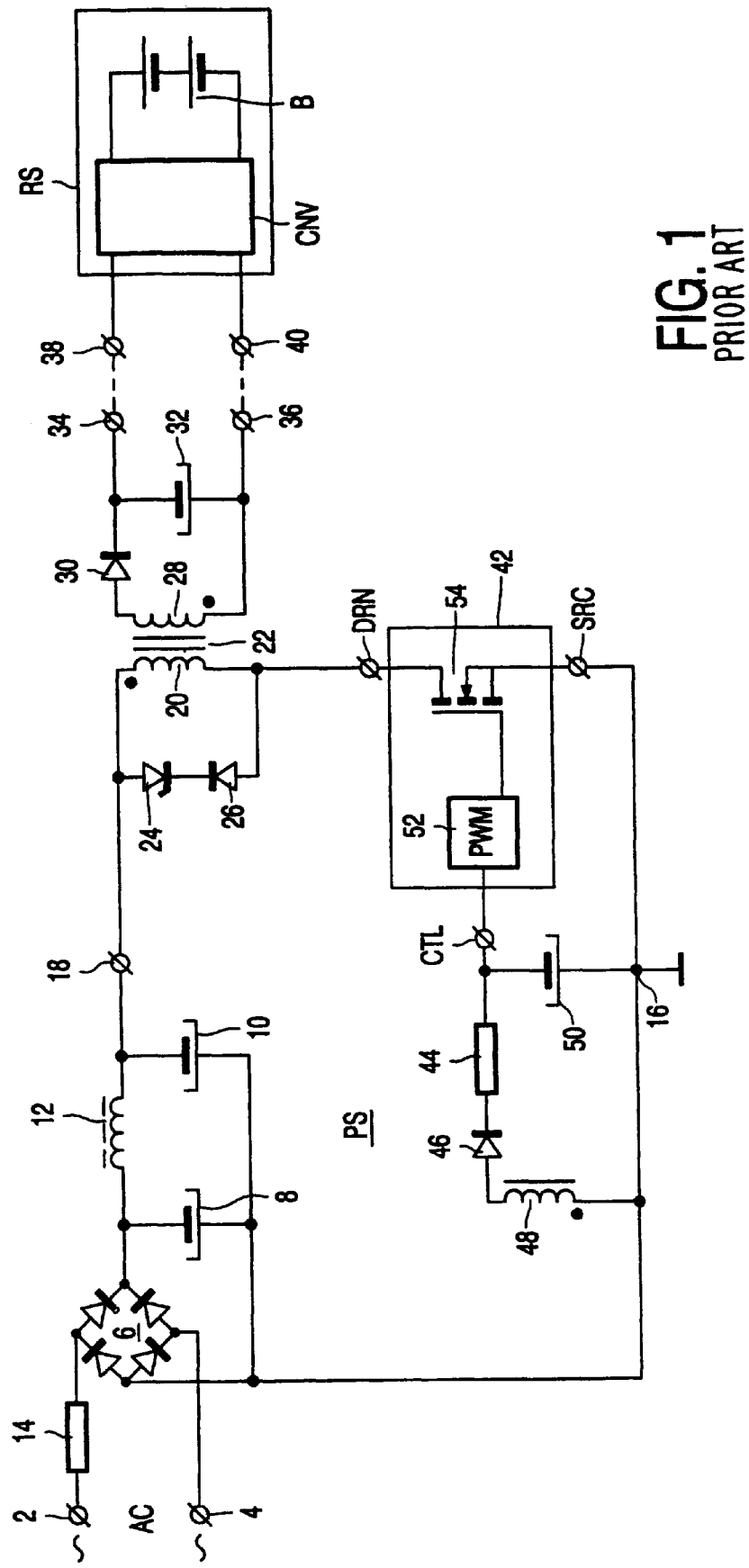
FIG. 1 shows a known switched-mode power supply in combination with an appliance to be powered.

FIG. 1 shows the block diagram of a known switched-mode power supply PS in combination with a rechargeable shaver RS. The a.c. mains voltage or a suitable direct voltage is applied to the input terminals 2 and 4. If desired, the a.c. mains voltage can be applied via a transformer (not shown). The alternating voltage is rectified by means of a diode bridge 6 and is smoothed and filtered by means of capacitors 8 and 10 and a coil 12. It is also possible to use a single rectifier diode instead of a diode bridge. An optional resistor 14 limits the current through the diode bridge 6. The negative terminal of the rectified input voltage is connected to a ground terminal 16. The positive terminal 18 is connected to the primary winding 20 of a transformer 22. A zener diode 24 and a diode 26 are arranged in parallel with the primary winding 20 and limit the voltage across the primary winding 20 when the current through the primary winding 20 is interrupted. Instead of the zener diode 24 and the diode 26 shown here, alternative circuits, for example, a series arrangement of a capacitor and a resistor, can be used in order to define the variation of the voltage across the primary winding 20.

The transformer 22 also has a secondary winding 28 whose alternating voltage is rectified by means of a rectifier diode 30 and is smoothed by means of a capacitor 32. The voltage across the capacitor 32 powers a load, which is shown, by way of example, as a rechargeable shaver RS having a down-converter CNV which charges a rechargeable battery B of the shaver. The switched-mode power supply PS can be accommodated in the electrical apparatus itself, in a wall mount or a stand, or in a mains voltage adapter, also referred to as a power plug. In the two last-mentioned cases the load is connected to the capacitor 32 via two pairs of contacts 34/36 and 38/40.

FIG. 1 further shows a switcher IC type TOP210 which is commercially available from Power Integrations, Inc. The switcher IC 42 has a terminal DRN ("DRAIN") to which the primary winding 20 is connected, a terminal SRC ("SOURCE"), which is connected to the ground terminal 16, and a terminal CTL ("CONTROL"), which is connected to a first terminal of an auxiliary winding 48 of the transformer 22 via a resistor 44 and a diode 46, which auxiliary winding has its other terminal connected to the terminal SRC of the switcher IC 42. An alternating voltage proportional to the alternating voltage across the secondary winding 28 appears across the auxiliary winding 48. This voltage is rectified by means of a diode 46 and is stored in a smoothing capacitor 50 connected between the terminals CTL and SRC. The switcher IC comprises a control circuit 52 which controls the duty cycle of a switching transistor 54 connected between the terminals SRC and DRN. The duty cycle is controlled in response to the current applied to the terminal CTL. Special means in the control circuit 52 maintain the voltage on the control input CTL constant so as to obtain a fixed voltage which also serves as the supply voltage for the control circuit 52. For more details on this, reference is made to the data sheets of said switcher IC. Since the smoothing capacitor 50 is connected to the control input CTL, the voltage on the smoothing capacitor 50 in normal operation is equal to the fixed voltage. As a result of this, there is a fixed relationship between the amplitude of the alternating voltage across the auxiliary winding 48 and the fixed voltage. The turns ratio between the auxiliary winding 48 and the secondary winding 28 then defines the amplitude of the alternating voltage across the secondary winding 28 and, consequently, that of the rectified voltage across the load. In this way there is a fixed relationship between the direct voltage across the load to be powered and the fixed voltage on the control input CTL of the control circuit of the switcher IC. This known switched-mode power supply is very suitable as a flyback converter with a constant output voltage, for example 12 V on the terminals 34 and 36 across the capacitor 32. The down-converter in the rechargeable shaver RS converts the 12 V into a charging current for the battery B. Such a configuration has the advantage of a comparatively small current through the connection lead between the power supply circuit PS and the rechargeable shaver RS. Moreover, it is thus achieved that batteries with a comparatively low terminal voltage, for example 2.5 V, can still be charged by means of the known switcher IC. A direct connection of a rechargeable 2.5 V battery causes the a.c. component across the secondary winding 28 and, as a result of this, also the a.c. component across the auxiliary winding 48 to decrease. The rectified voltage across the smoothing capacitor 50, which also forms the supply voltage for the control circuit 52, then drops below a critical limit, upon which the control circuit 52 is set to the so-called auto-restart mode, in which the control circuit 52 attempts to build up enough voltage, with a duty cycle of 5 percent, across the load to be powered and, consequently, also across the smoothing capacitor 50 to eventually allow a return to normal operation. For more details reference is made again to the data sheets of said switcher IC. Under these conditions, in the known power supply circuit some power is supplied to the load to be powered, but this is usually much lower than the power required to charge the still exhausted rechargeable battery B until the battery voltage has increased far enough to restore the switcher IC to normal operation.

Figure 2:
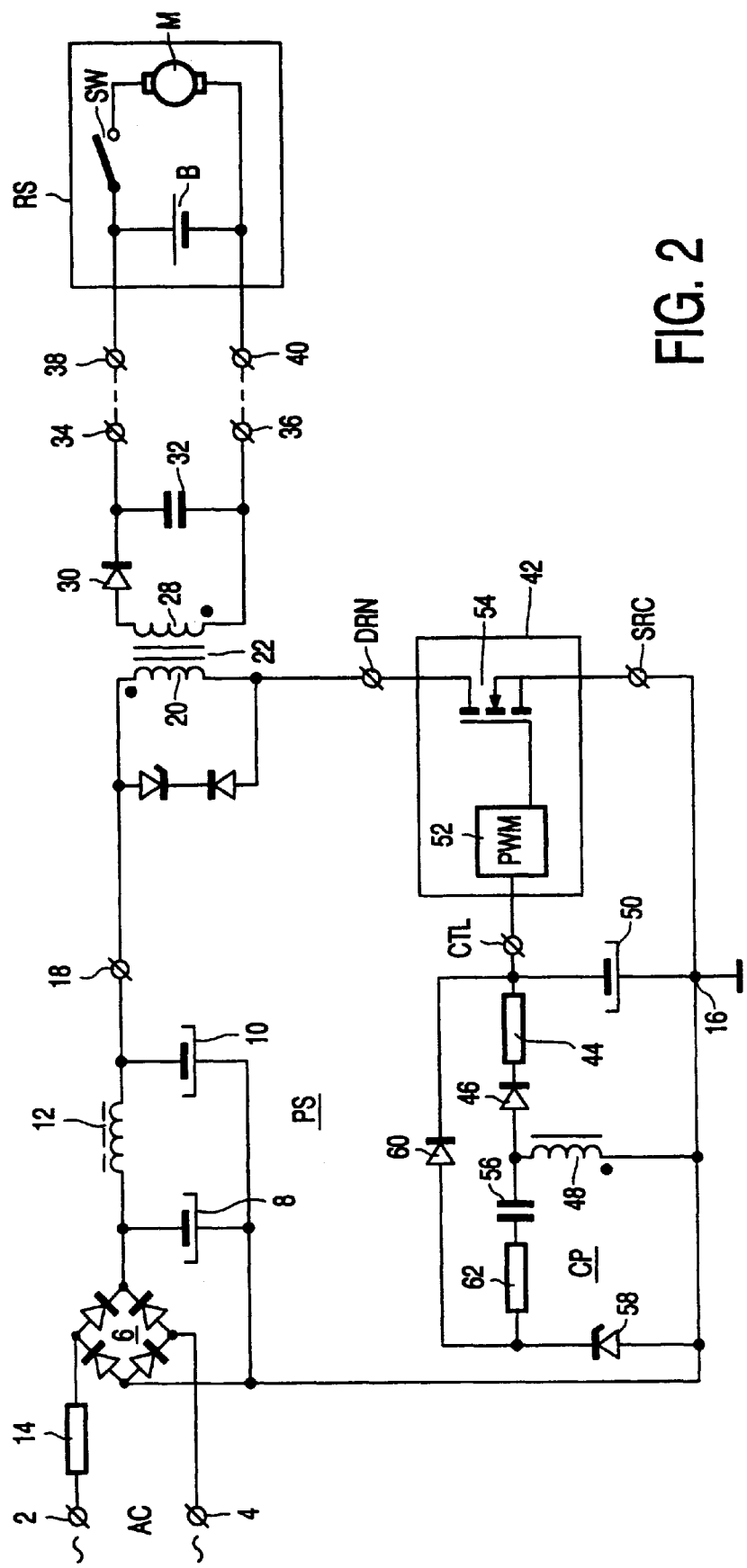
FIG. 2 shows a switched-mode power supply in accordance with the invention in combination with an appliance having rechargeable batteries.

In order to enable batteries with a low terminal voltage to be charged without a down-converter and thus save costs, the power supply circuit PS has been modified as shown in FIG. 2. The rechargeable shaver RS, or any other rechargeable apparatus whatsoever, has a rechargeable battery B which is connected directly to the capacitor 32 of the power supply circuit PS. The rechargeable shaver further comprises an electric shaver motor M, which can be connected to the battery B via a switch SW. The power supply circuit PS comprises a charge pump CP which converts the alternating voltage across the auxiliary winding 48 into charge which is applied to the smoothing capacitor 50. The charge pump CP prevents restarting of the switcher IC 42. Owing to the low terminal voltage of the battery B the alternating voltage across the auxiliary winding 48 would fall below an amplitude for which the rectified voltage across the smoothing capacitor 50 decreases below the fixed voltage. This would cause the control circuit 52 to switch to the auto-restart mode. However, the charge pump provides extra charge for the smoothing capacitor 50, as a result of which the voltage across the smoothing capacitor 50 can be maintained at the fixed voltage for a longer time and the control circuit 52 does not yet change over to the auto-restart mode. As long as the amplitude of the alternating voltage across the auxiliary winding 48 is still sufficiently large the switched-mode power supply behaves as a source of constant power when the voltage across the load to be powered decreases below the nominal value. As a matter of fact, the control circuit 52 remains operative and in each switching cycle of the switching transistor 54 a power proportional to the switching frequency and the square of the peak current through the primary winding 20 builds up in the primary winding 20. Since both the switching frequency and the peak current are constant, a constant average power is supplied to the load to be powered.

The charge pump CP comprises a capacitor 56 and a zener diode 58, arranged in series across the auxiliary winding 48, and a diode 60, connected between the smoothing capacitor 50 and a node between the capacitor 56 and the zener diode 58. An optional current-limiting resistor 62 is arranged between the capacitor 56 and the zener diode 58. The zener diode 58 prevents the charge pump CP from being operative in normal operation. The zener diode 58 limits the alternating voltage, which prevents the diode 60 from being turned on when the constant voltage which is characteristic of normal operation of the control circuit 52 appears across the smoothing capacitor 50.

Figure 3:
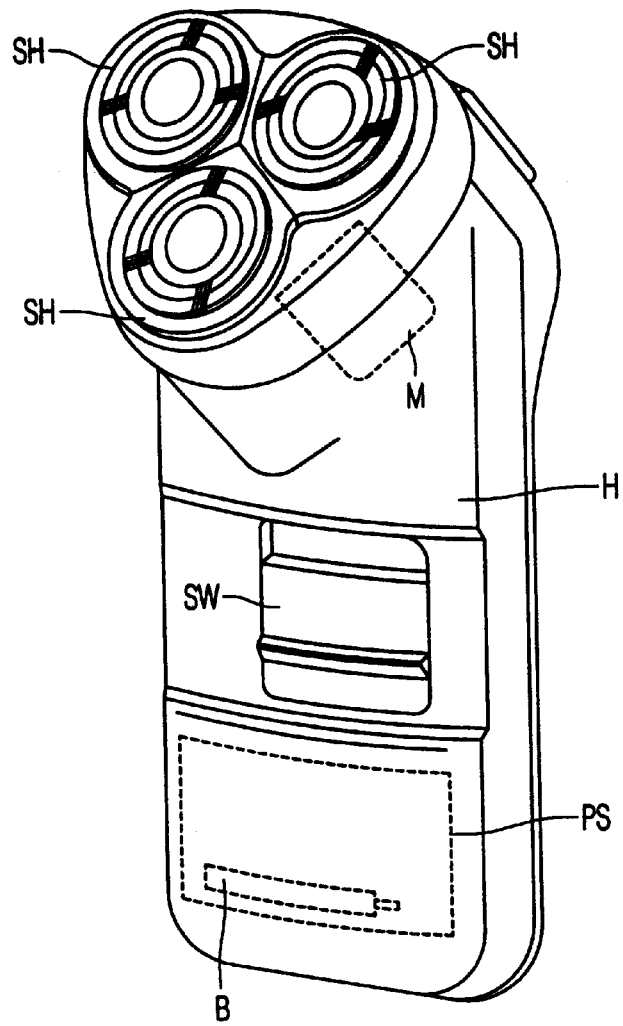
FIG. 3 shows an electric shaver having a rechargeable battery.
Figure 4:
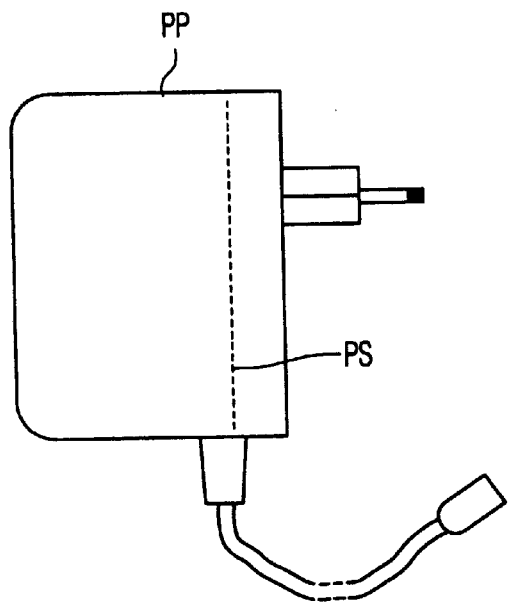
FIG. 4 shows a mains voltage adapter including a switched-mode power supply in accordance with the invention for use with the shaver shown in FIG. 3.

The power supply circuit in accordance with the invention is suitable for electrical apparatuses having rechargeable batteries, for example, NiCd or NiMH batteries, which are charged from the mains voltage. FIG. 3 shows, by way of example, an electric shaver having a housing H, which accommodates the power supply circuit, referenced PS, the rechargeable battery B and the motor M. The motor drives the shaving heads SH and is activated by means of the switch SW. FIG. 4 shows a mains voltage adapter or power plug PP including the power supply circuit PS. The power plug has a connection lead which can be connected to the shaver of FIG. 3, in which case the shaver does not include the power supply circuit PS.

We claim:

1. A switched-mode power supply, comprising:
    a transformer having a primary winding and at least an auxiliary winding;
    a controllable switch connected in series with the primary winding so as to receive an input voltage;
    a control circuit having an output coupled to a control input of the controllable switch to supply control signals to the controllable switch for turning on and turning off the controllable switch, and having a control input for receiving a control voltage for powering the control circuit and for controlling the timing of the turn-on and turn-off of the controllable switch;
    a rectifier and a smoothing capacitor, connected in series to the auxiliary winding to generate the control voltage, wherein the switched-mode power supply further comprises:
        a charge pump coupled to the auxiliary winding to convert an alternating voltage across the auxiliary winding into a direct voltage across the smoothing capacitor.

2. A switched-mode power supply as claimed in claim 1, wherein the charge pump comprises: a further capacitor and a first diode connected in series across the auxiliary winding, and a second diode, connected between the smoothing capacitor and a node between the further capacitor (56) and the first diode.

3. A switched-mode power supply as claimed in claim 2, wherein the first diode is a zener diode.

4. An electric shaving system comprising: a shaver which incorporates a rechargeable battery, an electrical load including a motor, a switch for connecting the load to the battery, and a switched-mode power supply as claimed in claim 1, for supplying power to at least the battery and/or the load.

* * * * *